(12) United States Patent
Martin et al.

(10) Patent No.: US 10,830,102 B2
(45) Date of Patent: Nov. 10, 2020

(54) CASING WITH TUNABLE LATTICE STRUCTURE

(71) Applicant: General Electric Company, Schenectady, NY (US)

(72) Inventors: Andrew J. Martin, Blue Ash, OH (US); Arthur William Sibbach, Boxford, MA (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 15/909,009

(22) Filed: Mar. 1, 2018

(65) Prior Publication Data

US 2019/0271237 A1 Sep. 5, 2019

(51) Int. Cl.
| | | |
|---|---|---|
| *F01D 11/18* | (2006.01) | |
| *F01D 25/26* | (2006.01) | |
| *B32B 3/12* | (2006.01) | |
| *B33Y 10/00* | (2015.01) | |
| *B33Y 80/00* | (2015.01) | |

(52) U.S. Cl.
CPC ............. *F01D 25/26* (2013.01); *B32B 3/12* (2013.01); *B33Y 10/00* (2014.12); *F01D 11/18* (2013.01); *B33Y 80/00* (2014.12); *F05D 2230/22* (2013.01); *F05D 2230/31* (2013.01); *F05D 2250/29* (2013.01); *F05D 2260/30* (2013.01); *F05D 2300/5021* (2013.01)

(58) Field of Classification Search
CPC ......... B33Y 80/00; F23R 3/002; F01D 25/26; F01D 11/08; B32B 3/12; B32B 2605/18; B32B 2307/54; F05D 2250/29
See application file for complete search history.

(56) References Cited

U.S. PATENT DOCUMENTS

| | | | | |
|---|---|---|---|---|
| 3,542,152 | A | * 11/1970 | Oxx, Jr. ................ | B64D 33/02 |
| | | | | 181/214 |
| 4,642,993 | A | 2/1987 | Sweet | |
| 5,282,718 | A | 2/1994 | Koff et al. | |
| 5,308,225 | A | 5/1994 | Koff et al. | |
| 8,586,179 | B1 * | 11/2013 | Jacobsen ................... | B32B 7/08 |
| | | | | 428/315.5 |
| 8,652,602 | B1 * | 2/2014 | Dolla ..................... | B29C 44/357 |
| | | | | 428/36.1 |

(Continued)

*Primary Examiner* — Eldon T Brockman
*Assistant Examiner* — Wesley Le Fisher
(74) *Attorney, Agent, or Firm* — Dinsmore & Shohl LLP

(57) ABSTRACT

Casings and methods for manufacturing casings are provided. For example, a casing defining radial, axial, and circumferential directions is provided. The casing comprises an annular inner wall and an annular outer wall, each extending along the axial direction, with the outer wall radially spaced apart from the inner wall. The casing also comprises an auxetic structure extending from the inner wall to the outer wall and including a plurality of lattice elements. Each lattice element extends circumferentially and radially from the inner to the outer wall, and the lattice elements are axially spaced apart from one another. The auxetic structure may define at least one aperture for fluid flow from one portion to another of the auxetic structure and/or may be configured to vary the thermal characteristics of the casing along the axial direction. The casing may be integrally formed as a single monolithic component, e.g., by additive manufacturing.

19 Claims, 10 Drawing Sheets

(56) References Cited

U.S. PATENT DOCUMENTS

| | | | |
|---|---|---|---|
| 9,534,505 B2* | 1/2017 | Lucas | F01D 21/045 |
| 9,546,660 B2 | 1/2017 | Lucas et al. | |
| 10,266,310 B2* | 4/2019 | Li | B65D 39/12 |
| 2006/0163431 A1* | 7/2006 | Dittrich | B64C 3/26 |
| | | | 244/126 |
| 2011/0240190 A1* | 10/2011 | Summers | G06F 17/5095 |
| | | | 152/151 |
| 2013/0315456 A1* | 11/2013 | Marugame | G06T 7/0012 |
| | | | 382/128 |
| 2014/0161601 A1* | 6/2014 | Geiger | F01D 5/005 |
| | | | 415/200 |
| 2014/0251585 A1 | 9/2014 | Kusuda et al. | |
| 2015/0345320 A1* | 12/2015 | Webb | F01D 25/24 |
| | | | 415/196 |
| 2015/0369127 A1 | 12/2015 | Gilson et al. | |
| 2016/0023272 A1 | 1/2016 | Mongillo, Jr. et al. | |
| 2016/0152314 A1 | 6/2016 | Carlsten et al. | |
| 2016/0290647 A1 | 10/2016 | Propheter-Hinckley et al. | |
| 2017/0022111 A1 | 1/2017 | Jarvis et al. | |
| 2017/0023084 A1 | 1/2017 | Guest et al. | |
| 2017/0058985 A1* | 3/2017 | Martino Gonzalez | F16F 7/00 |
| 2018/0134365 A1* | 5/2018 | Knipprath | B64C 1/062 |
| 2018/0312239 A1* | 11/2018 | Velez De Mendiz Bal Alonso | B64C 1/12 |
| 2019/0185129 A1* | 6/2019 | Wang | B64C 1/10 |

\* cited by examiner

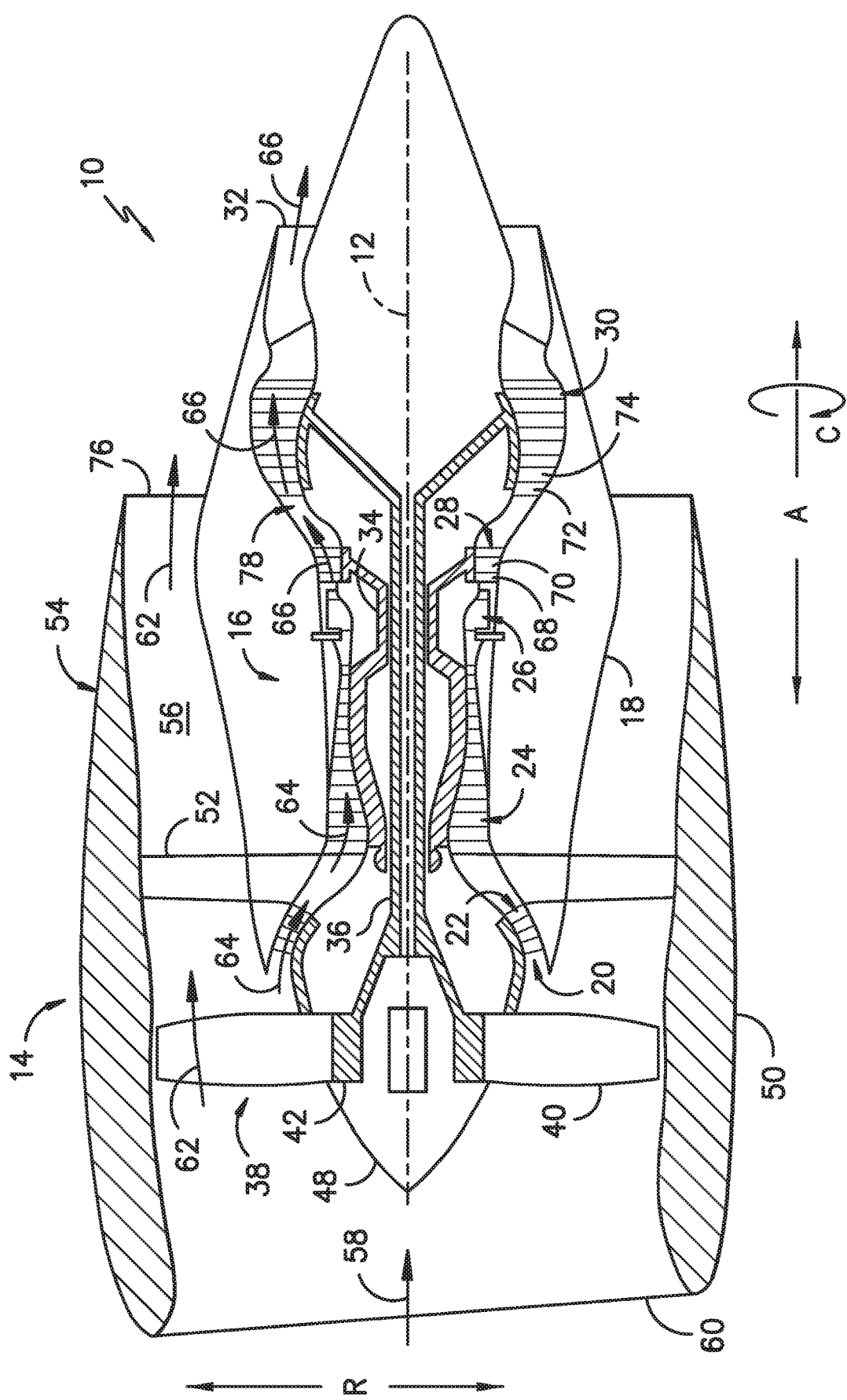
FIG. -1-

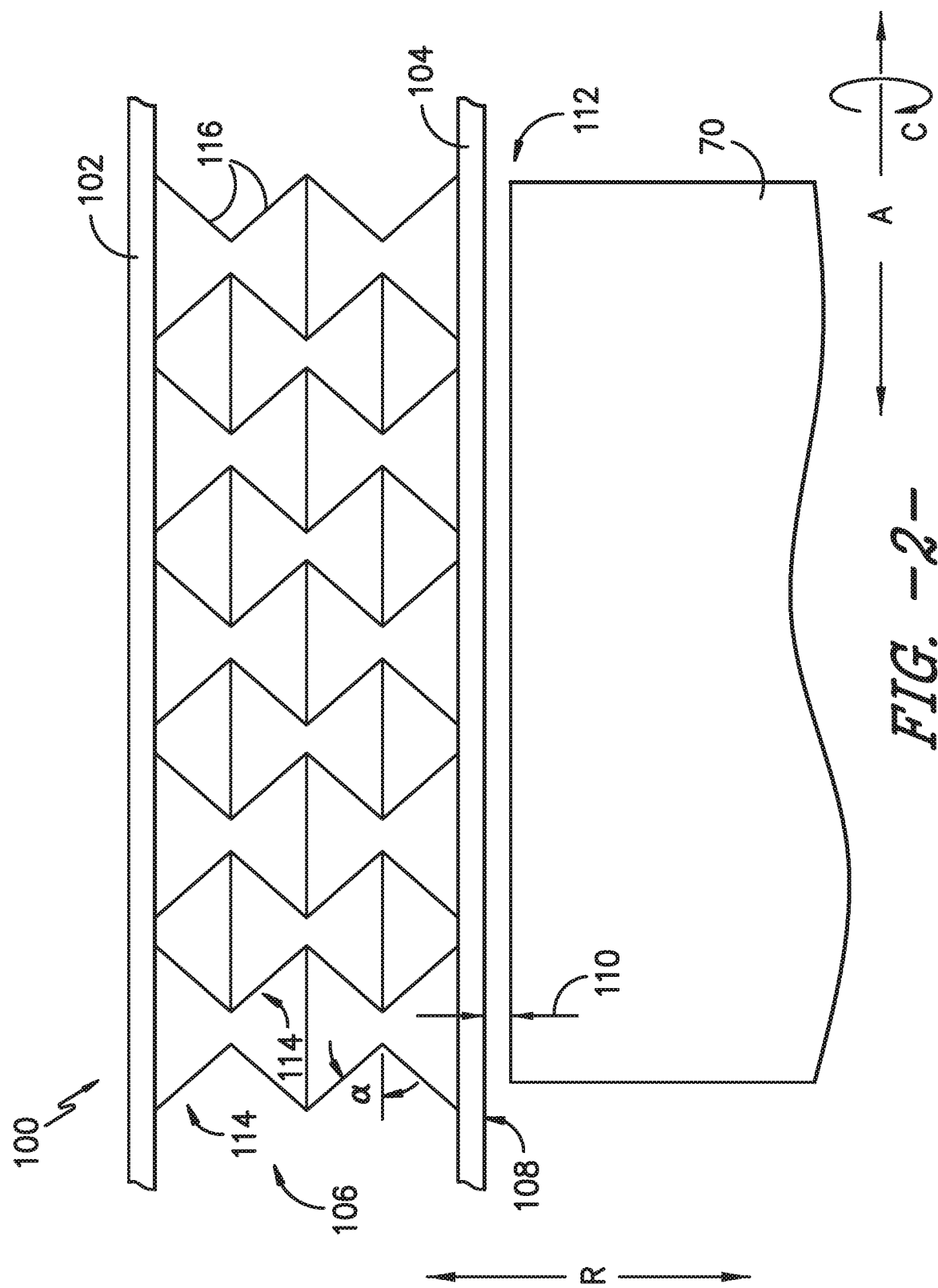
FIG. -2-

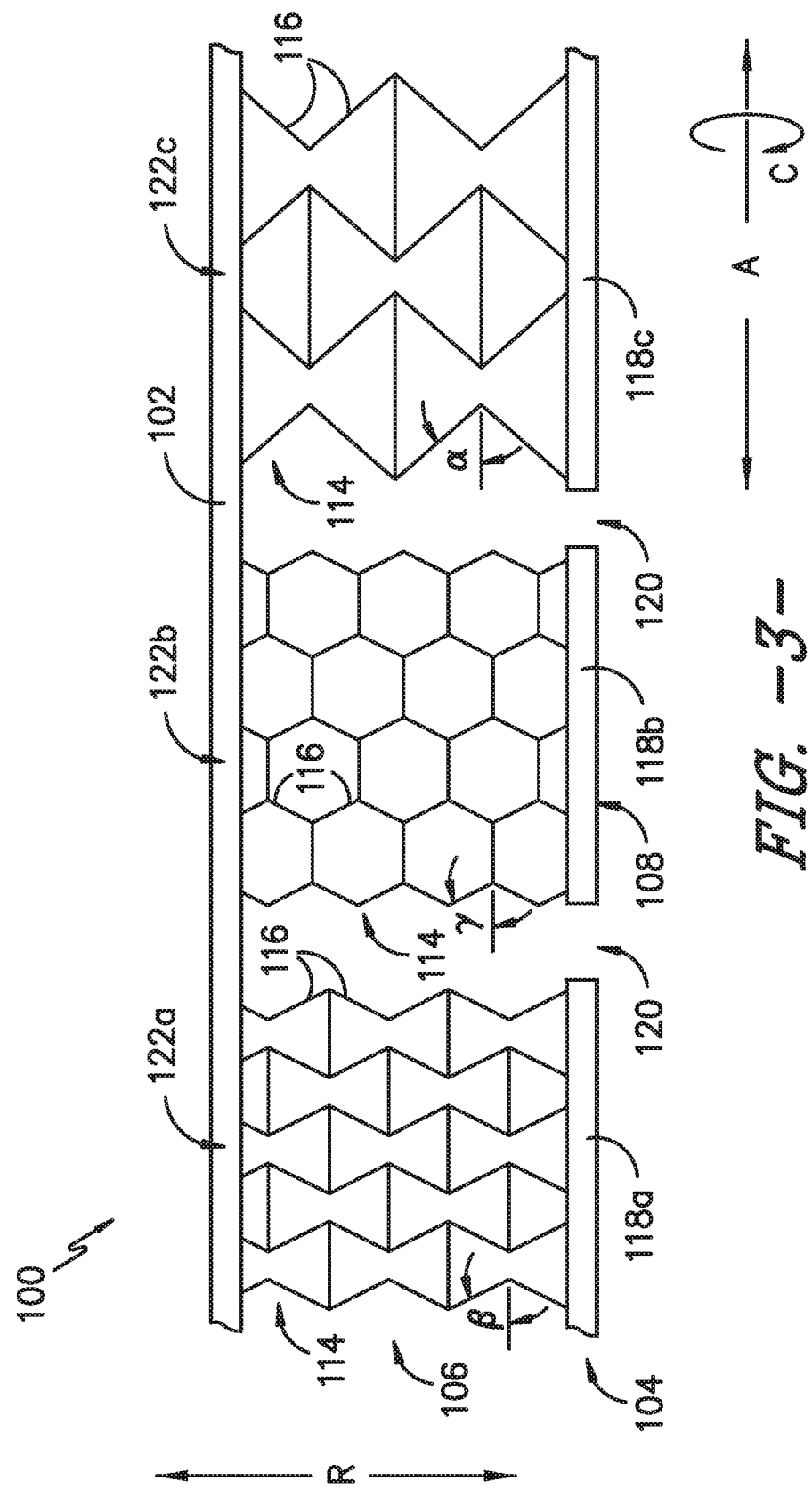
FIG. -3-

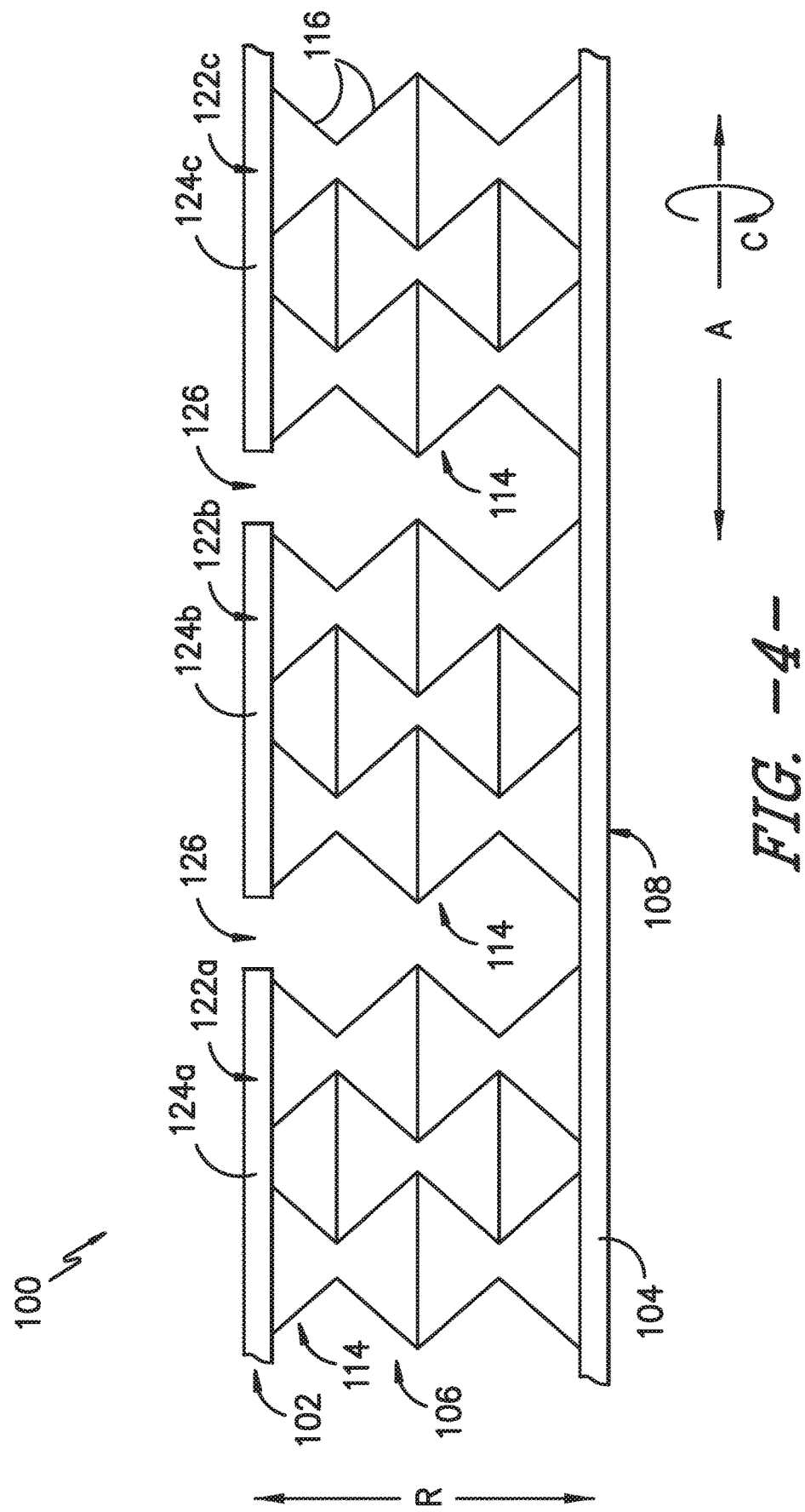
FIG. -4-

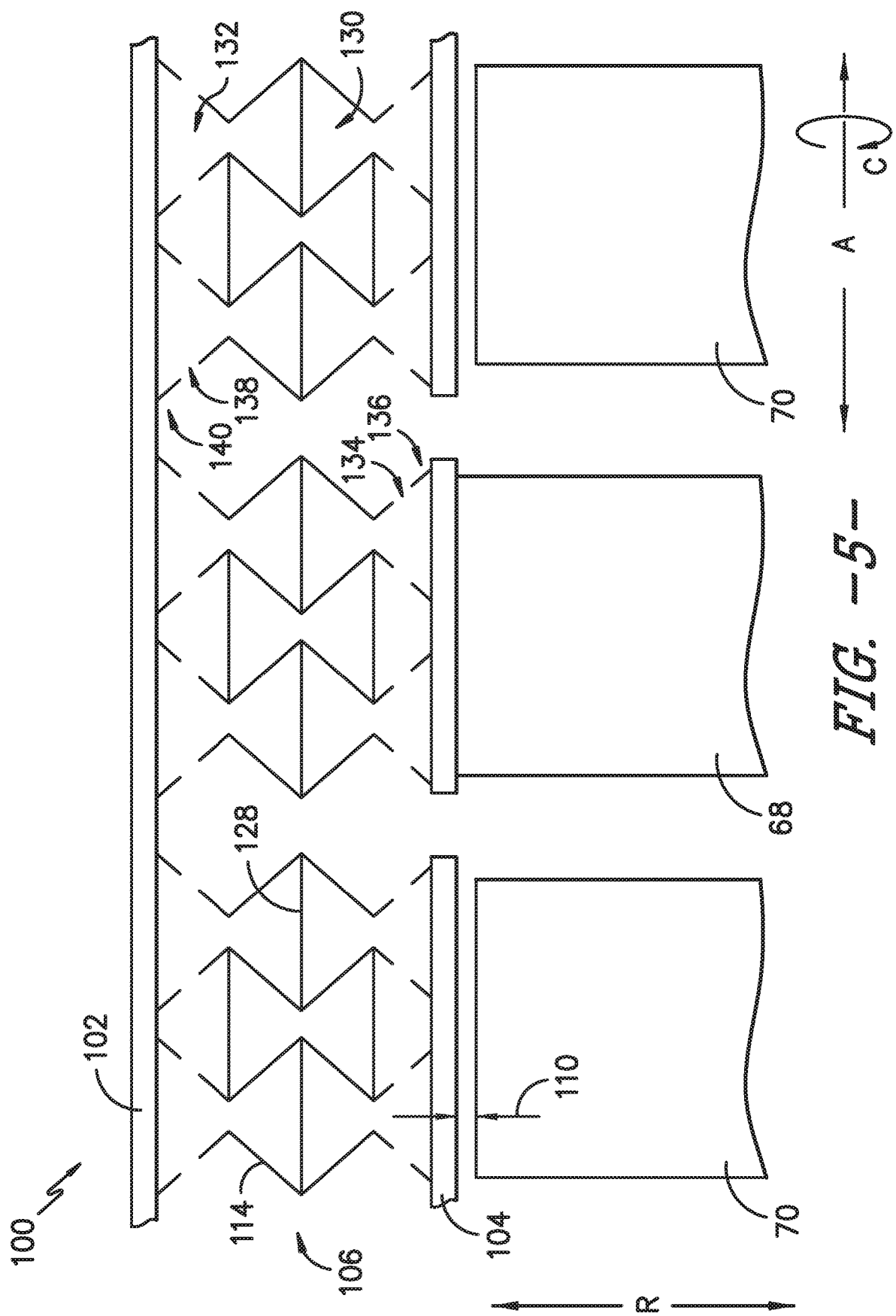

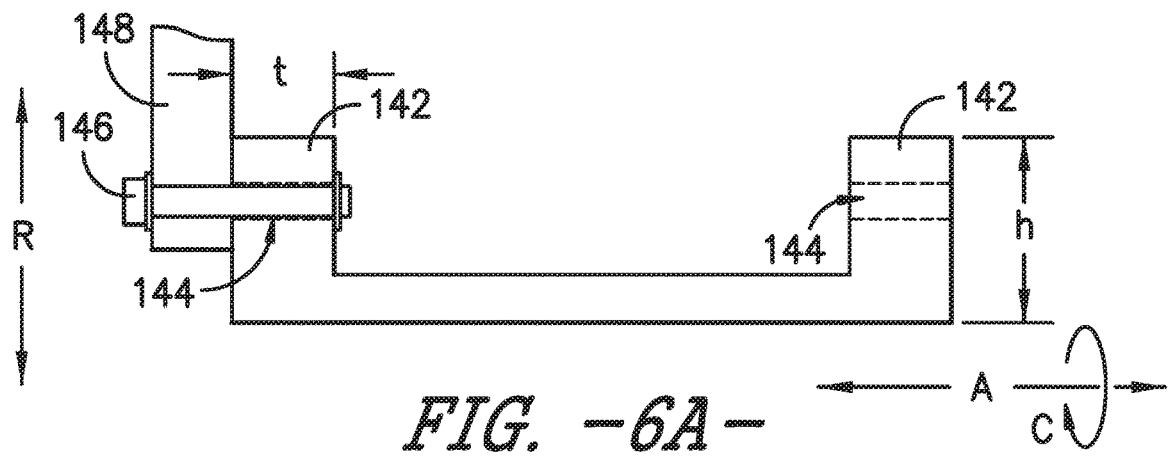
FIG. -6A-
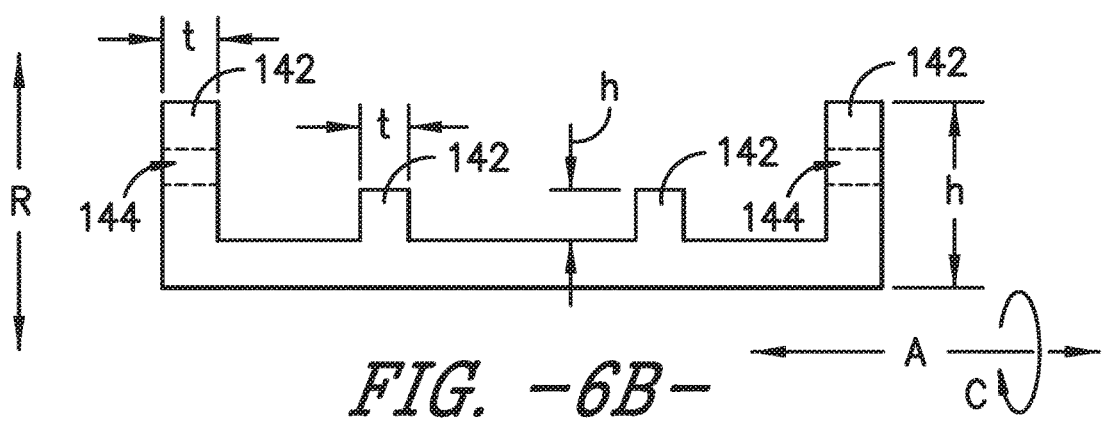
FIG. -6B-
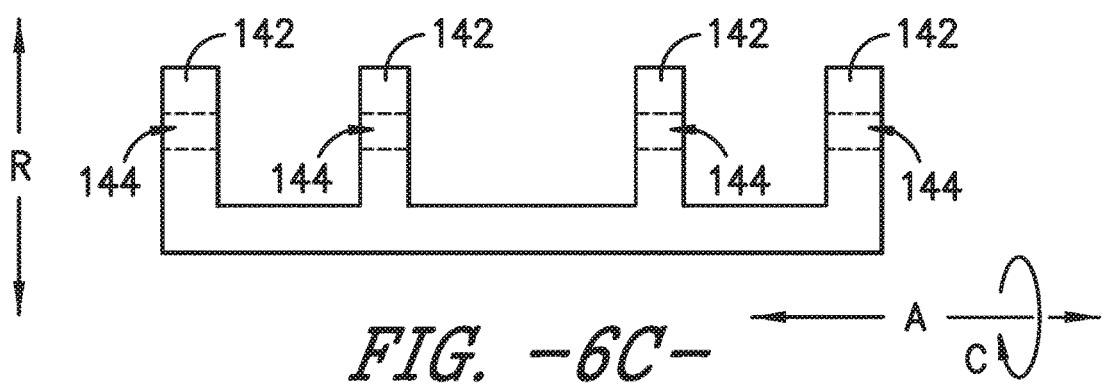
FIG. -6C-
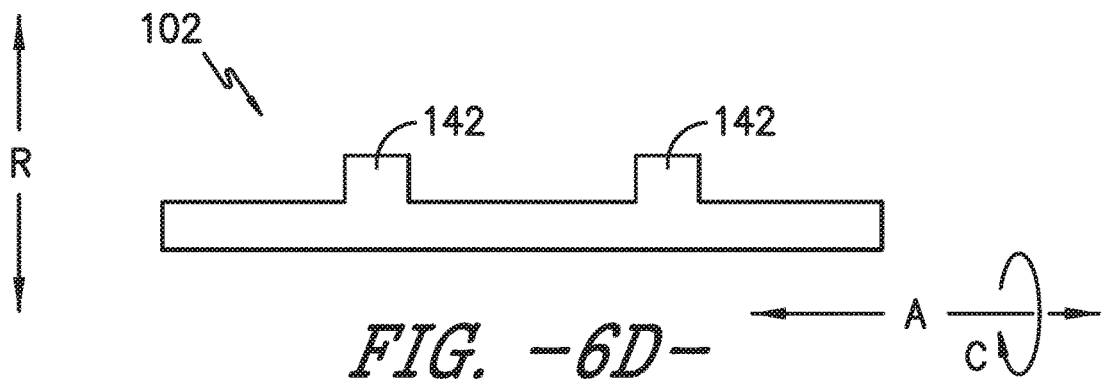
FIG. -6D-

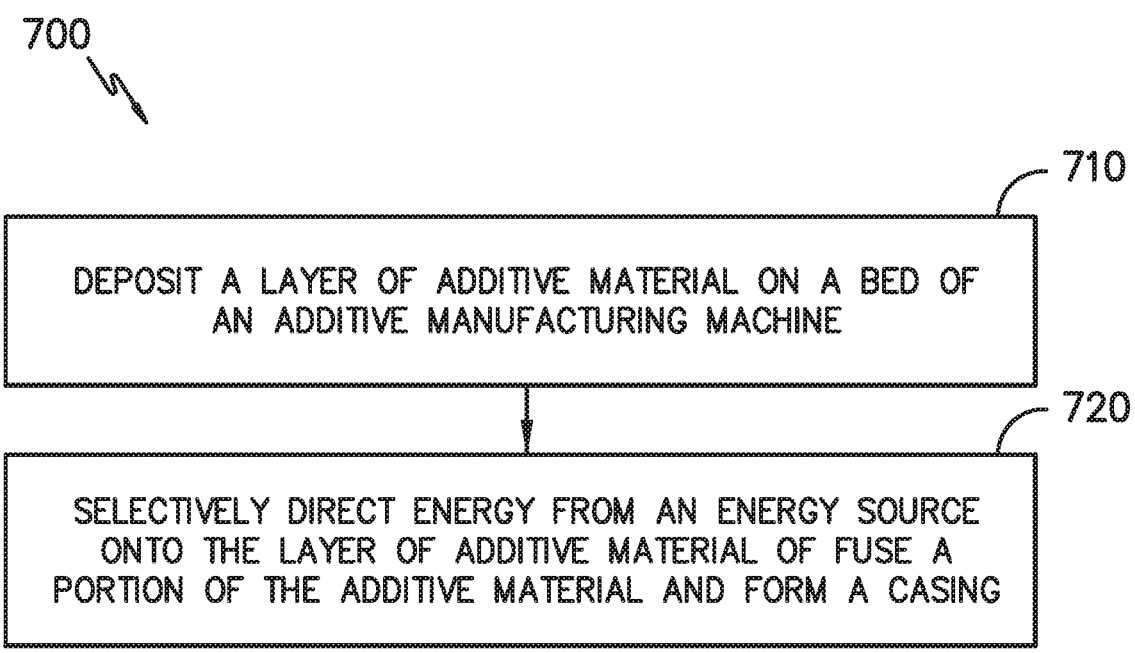
FIG. -7-

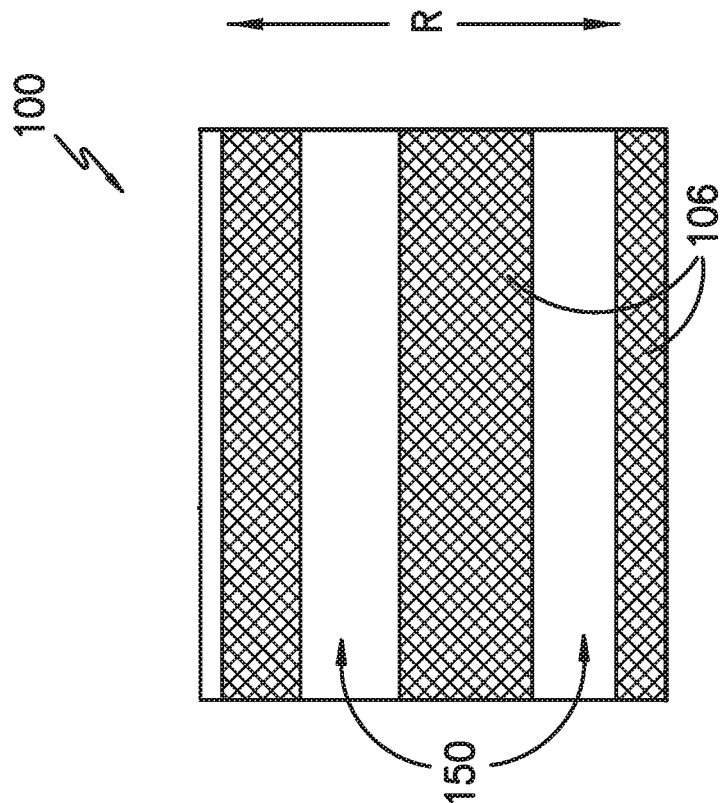
FIG. -8B-
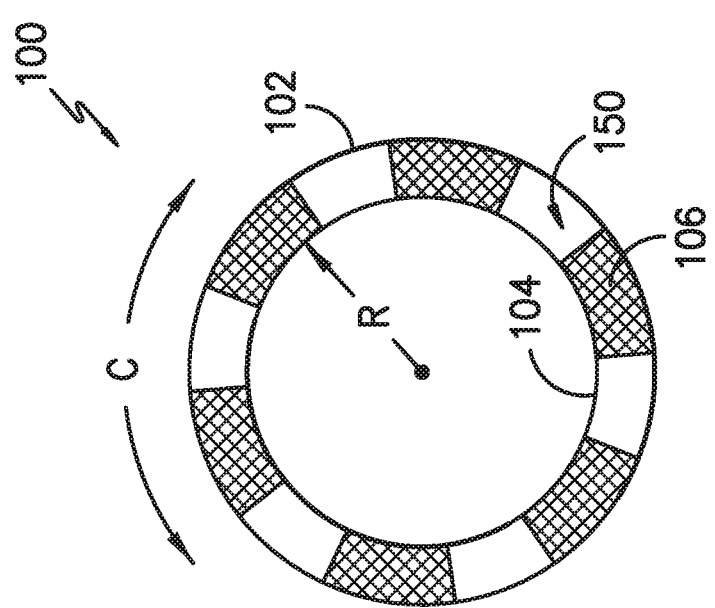
FIG. -8A-

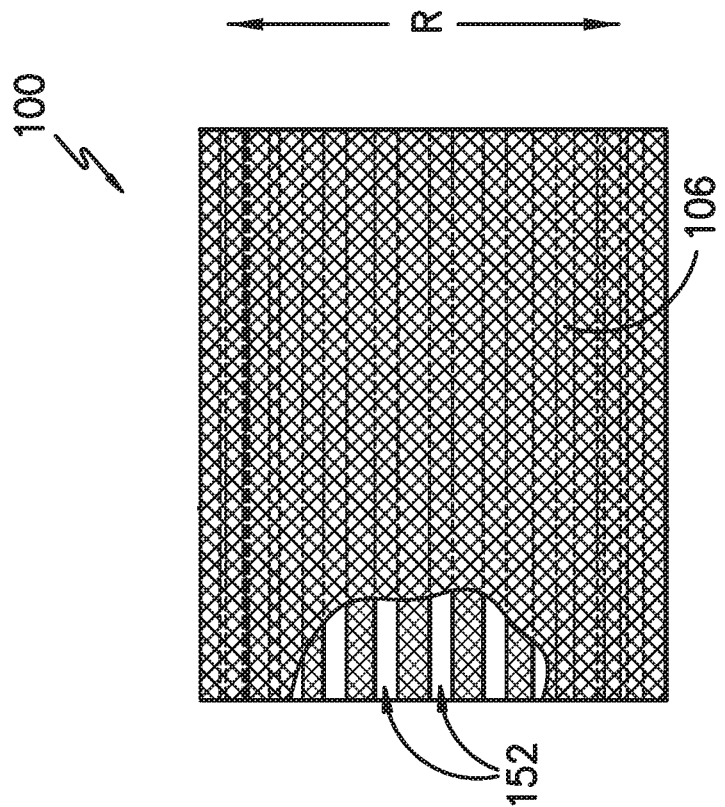
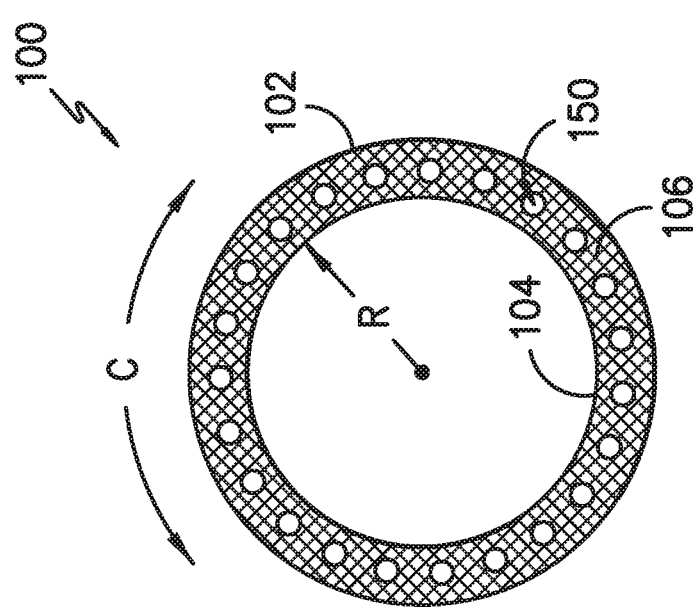

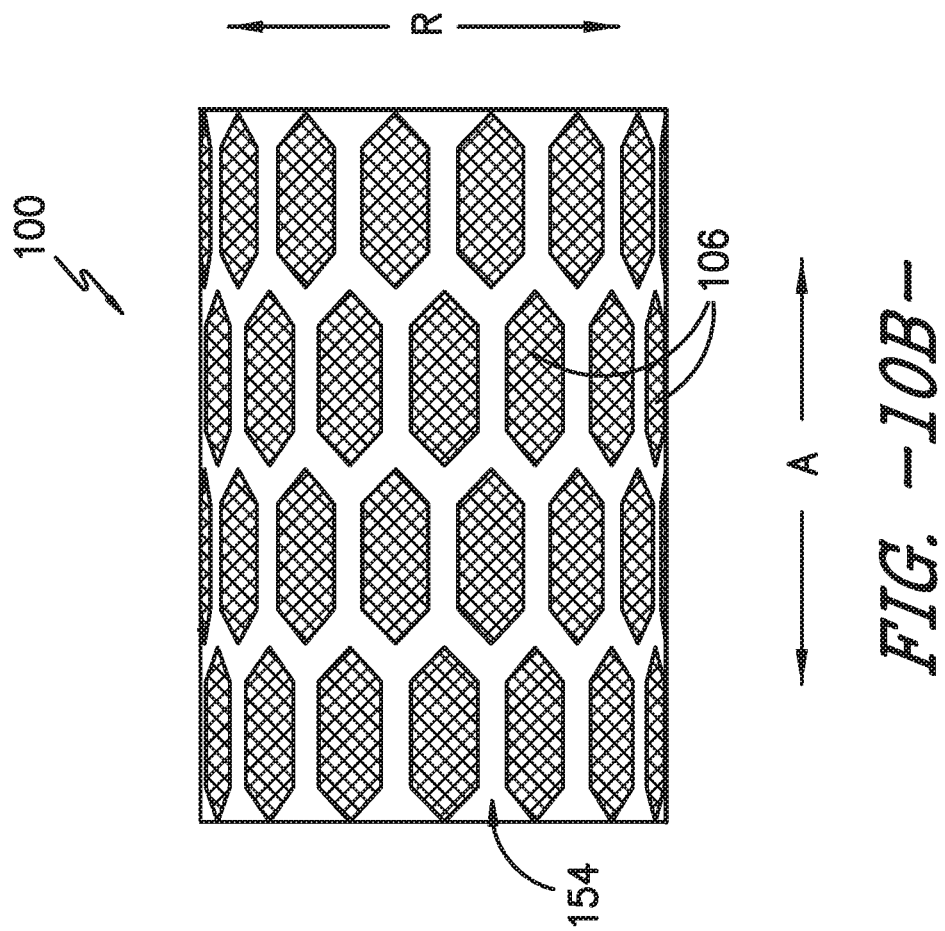
FIG. -10B-
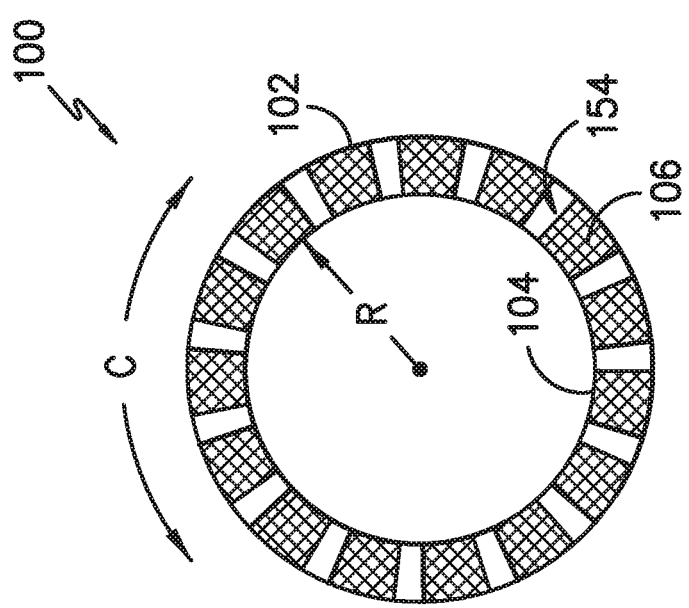
FIG. -10A-

CASING WITH TUNABLE LATTICE STRUCTURE

FIELD

The present subject matter relates generally to gas turbine engines. More particularly, the present subject matter relates to double-walled casings for gas turbine engines having a lattice structure extending between the walls that may be tuned according to casing loading conditions.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, a casing or housing formed from a single wall of material surrounds the core of the gas turbine engine. The casing experiences a variety of loads, such as thermal loads, pressure loads, and mechanical loads, which influence the clearances between components within the casing, as well as between such components and the casing. For instance, over a time period of engine operation, the clearance between rotor blades, e.g., compressor rotor blades and turbine rotor blades, and an inner surface of the casing varies due to rotor growth and casing growth, e.g., through rotational speed of the rotor and thermal expansion of the rotating components and the casing. As such, the clearance transitions over the operational period between a relatively large clearance and a relatively small clearance, which can negatively impact compressor operability, increase transient loss of component efficiencies, require increased transient temperatures throughout the engine, and increase the tendency for tip rubs. Usually, one or more additional systems or schemes, such as an active clearance control system or compressor bleeds, are used in an attempt to reduce clearance variability. Such systems or schemes typically increase the weight and complexity of the engine, while reducing the engine's efficiency.

However, structures such as an auxetic lattice structure can be integrated into the casing to resist growth and maintain clearances without significantly increasing the weight of the casing and could reduce the overall engine weight by eliminating the additional systems, such as the active clearance control system. Auxetic structures resist growth in an expected direction, and the use of such passive structures in the casing could allow improved matching of the time constants between the static and rotating components of the engine to better maintain the clearances within the casing. Further, by additively manufacturing the casing, the casing could incorporate other features for improving engine efficiency without significantly increasing the weight of the casing and without negatively impacting the manufacturing and assembly complexity of the engine.

Accordingly, improved casings, such as a casing that has a reduced growth to maintain the clearances between static and rotating components of a gas turbine engine over time, would be desirable. For example, a casing having an inner wall and an outer wall with a lattice structure therebetween that resists growth and/or casing changes due to mechanical, pressure, and thermal loads would be beneficial. More particularly, an integral casing formed by additive manufacturing and having an auxetic lattice structure would be useful.

BRIEF DESCRIPTION

Aspects and advantages of the invention will be set forth in part in the following description, or may be obvious from the description, or may be learned through practice of the invention.

In one exemplary embodiment of the present subject matter, a casing defining a radial direction, an axial direction, and a circumferential direction is provided. The casing comprises an annular inner wall extending along the axial direction and an annular outer wall extending along the axial direction. The outer wall is radially spaced apart from the inner wall. The casing also comprises an auxetic structure extending from the inner wall to the outer wall. The auxetic structure includes a plurality of lattice elements, each lattice element extending radially from the inner wall to the outer wall and circumferentially along the circumferential direction. Each of the plurality of lattice elements is spaced apart from one another along the axial direction. At least one aperture is defined in the auxetic structure for a flow of fluid from one portion of the auxetic structure to another portion of the auxetic structure. Further, the inner wall, outer wall, and auxetic structure are integrally formed as a single monolithic component.

In another exemplary embodiment of the present subject matter, an additively manufactured casing defining a radial direction, an axial direction, and a circumferential direction is provided. The additively manufactured casing comprises an annular inner wall extending along the axial direction and an annular outer wall extending along the axial direction. The outer wall is radially spaced apart from the inner wall. The casing also comprises an auxetic structure extending from the inner wall to the outer wall. The auxetic structure includes a plurality of lattice elements, each lattice element extending radially from the inner wall to the outer wall and circumferentially along the circumferential direction. Each of the plurality of lattice elements is spaced apart from one another along the axial direction. The auxetic structure is configured to vary the thermal characteristics of the casing along the axial direction.

In a further exemplary embodiment of the present subject matter, a method of manufacturing a casing is provided. The method comprises depositing a layer of additive material on a bed of an additive manufacturing machine and selectively directing energy from an energy source onto the layer of additive material to fuse a portion of the additive material and form the casing. The casing defines a radial direction, an axial direction, and a circumferential direction. The casing comprises an annular inner wall extending along the axial direction and an annular outer wall extending along the axial direction. The outer wall is radially spaced apart from the inner wall. The casing also comprises an auxetic structure extending from the inner wall to the outer wall. The auxetic structure includes a plurality of lattice elements, each lattice element extending radially from the inner wall to the outer wall and circumferentially along the circumferential direction. Each of the plurality of lattice elements is spaced apart from one another along the axial direction, and at least one aperture is defined in at least one lattice element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine including an acoustic liner, according to various embodiments of the present subject matter.

FIG. 2 provides a schematic cross-sectional view of a portion of an integral casing of a gas turbine engine, the casing having an inner wall, an outer wall, and a lattice structure extending from the inner wall to the outer wall, according to an exemplary embodiment of the present subject matter.

FIG. 3 provides a schematic cross-sectional view of a portion of an integral casing having various lattice structures and a discontinuous inner wall, according to an exemplary embodiment of the present subject matter.

FIG. 4 provides a schematic cross-sectional view of a portion of an integral casing having a discontinuous outer wall, according to an exemplary embodiment of the present subject matter.

FIG. 5 provides a schematic cross-sectional view of a portion of an integral casing having a discontinuous inner wall, an inner flow path, and an outer flow path, with a plurality of apertures defined in a lattice structure of the casing to allow fluid flow along each flow path, according to an exemplary embodiment of the present subject matter.

FIGS. 6A, 6B, 6C, and 6D provide schematic cross-section views of a portion of an outer wall of an integral casing, according to various embodiments of the present subject matter.

FIG. 7 provides a flow diagram of a method for forming an integral casing according to an exemplary embodiment of the present subject matter.

FIGS. 8A and 8B provide schematic cross-section views of a portion of an integral casing having an inner wall, an outer wall, and a lattice structure extending from the inner wall to the outer wall, where the lattice structure is circumferentially discontinuous, according to an exemplary embodiment of the present subject matter.

FIGS. 9A and 9B provide schematic cross-section views of a portion of an integral casing having an inner wall, an outer wall, and a lattice structure extending from the inner wall to the outer wall, with tubes for fluid passage extending through the lattice structure, according to an exemplary embodiment of the present subject matter.

FIGS. 10A and 10B provide schematic cross-section views of a portion of an integral casing having an inner wall, an outer wall, and a lattice structure extending from the inner wall to the outer wall, where the lattice structure is constructed in a pattern with an open area between sections of the lattice structure, according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within an engine, with forward referring to a position closer to an ambient air inlet and aft referring to a position closer to an exhaust nozzle of the engine. The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, terms of approximation, such as "approximately," "substantially," or "about," refer to being within a ten percent margin of error.

The present subject matter is generally directed to a casing and a method for additively manufacturing the casing. The casing described herein is an integral structure that includes an axially extending annular inner wall, an axially extending annular outer wall that is radially spaced apart from the inner wall, and a lattice structure extending from the inner wall to the outer wall. The lattice structure includes a plurality of lattice elements that each extend circumferentially from the inner wall to the outer wall and are axially spaced apart from one another. Preferably, the lattice structure is an auxetic lattice structure, and the casing is a casing of a gas turbine engine. In particular embodiments, each lattice elements defines an aperture therein to thereby define a fluid flow path through the lattice structure. In still other embodiments, the lattice structure varies axially such that the casing has different thermal characteristics along the axial direction.

By integrating the various portions of the casing into a single piece structure, the casing can be thermally matched to adjacent components, e.g., to reduce differences in thermal growth between adjacent components and thereby maintain clearances between the casing and such components. Further, the casing can be thermally matched globally, i.e., as a whole, or locally, i.e., one segment or section of the casing can be thermally matched to an adjacent component while another segment or section of the casing is thermally matched to its adjacent component. Such thermal matching may improve axisymmetric and non-axisymmetric steady-state and transient clearances in compressor and turbine sections of gas turbine engines, which can reduce the transient loss of component efficiencies, reduce transient temperatures throughout the engine, reduce the tendency for rotor blade tip rubs, and/or reduce steady-state operating clearances. Further, the casing described herein may reduce the need for active clearance control systems and/or other less efficient means of controlling the thermal expansion of the casing. Moreover, by additively manufacturing the casing, the casing can be thermally tuned to specific engines, to specific engine modules, and/or to specific compressor and/or turbine stages without appreciably impacting the weight, cost, supply chain delivery schedule, or certification of the casing. The additively manufactured casing also may incorporate one or more cooling and/or cooling air distribution schemes, recirculating tip treatment schemes, and/or dust removal schemes, such as cyclonic cooling air cleaners.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Referring now to FIG. 2, a schematic cross-sectional view of an integral casing 100 is provided according to an exemplary embodiment of the present subject matter. In the exemplary embodiment, the integral casing 100 encases, at least in part, the compressor sections 22, 24, the combustion section 26, and the turbine sections 28, 30 of the core turbine engine 16 of the turbofan engine 10. Accordingly, the integral casing 100 may form the outer casing 18 described above. In other embodiments, the integral casing 100 may extend about the fan 38 and, thus, may form the outer nacelle 50. In still other embodiments, the integral casing 100 may form a housing for other portions of the turbofan engine 10.

The integral casing 100 includes an annular outer wall 102 and an annular inner wall 104. Each of the outer wall 102 and the inner wall 104 extend along the axial direction A. The outer wall 102 is radially spaced apart from the inner wall 104. That is, the inner wall 104 is defined radially inward of the outer wall 102 such that the outer wall circumferentially surrounds the inner wall 104. A lattice structure 106 extends radially from the inner wall 104 to the outer wall 102, thereby connecting the inner wall 104 and outer wall 102. As described in greater detail herein, the lattice structure 106 may be an auxetic structure, i.e., a structure with a negative Poisson's ratio that, e.g., resists thermal growth in the expected direction of growth. Further, the lattice structure 106 may be tuned to respond to mechanical loads transmitted across or along an axial length of the casing 100 and to respond to pressure loads and thermal growth, e.g., to tightly control rotor tip clearances. The outer wall 102, inner wall 104, and lattice structure 106 are integrally formed as a single monolithic component.

In general, the exemplary embodiments of the integral casing 100 described herein may be manufactured or formed using any suitable process. However, in accordance with several aspects of the present subject matter, the integral casing 100 may be formed using an additive-manufacturing process, such as a 3D printing process. The use of such a process may allow the integral casing 100 to be formed integrally, as a single monolithic component, or as any suitable number of sub-components. In particular, the manufacturing process may allow the casing 100 to be integrally formed and include a variety of features not possible when using prior manufacturing methods. For example, the additive manufacturing methods described herein enable the manufacture of casings having any suitable size and shape with one or more configurations of lattice structure 106 between outer and inner walls 102, 104, and other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways, such as an inner flow path and an outer flow path defined by an auxetic structure that is integrally formed with an inner wall and an outer wall, between which the auxetic structure extends. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

As described above in reference to FIG. 2, the turbofan engine 10 includes integral casing 100 that, e.g., encases the compressor sections 22, 24, the combustion section 26, and the turbine sections 28, 30 of the core turbine engine 16. As particularly illustrated in FIG. 2, the casing 100 may extend adjacent the rotor airfoils or blades 70 of the HP turbine 28. The inner wall 104 of the integral casing 100 defines an inner surface 108. A gap 110 is defined between the inner surface 108 and a tip 112 of the turbine rotor blade 70. As described in greater detail herein, the integral casing 100 is configured such that the gap 110 is substantially maintained over time, i.e., the casing 100 responds to loads (e.g., thermal loads) such that the gap 110 between the inner surface 108 and the tip 112 remains generally unchanged during the operation of the engine 10. For example, the integral casing 100 may be substantially thermally matched to the turbine rotor blades 70 to essentially maintain the gap 110 between the blades 70 and the casing 100.

In the depicted embodiment, the lattice structure 106 is an auxetic structure 106 that extends from the inner wall 104 to the outer wall 102. The lattice or auxetic structure 106 includes a plurality of lattice elements 114. Each lattice element 114 extends along the circumferential direction C between the outer wall 102 and the inner wall 104, such that the lattice elements 114 extend circumferentially from the inner wall 104 to the outer wall 102. Further, the plurality of lattice elements 114 are spaced apart from one another along the axial direction A.

As shown in FIG. 2, each lattice element 114 comprises a plurality of lattice members 116. Each lattice member 116 extends at an angle α with respect to the axial direction A. The angle α may be between about 5° and about 35°, e.g., about 30° in particular embodiments. Referring to FIG. 3, the lattice members 116 may extend at other angles as well. For example, the lattice members 116 may extend at an angle β with respect to the axial direction A, and/or the lattice members 116 may extend at an angle γ with respect to the axial direction A. The angle β may be between about 35° and about 65°, e.g., about 60° in some embodiments, and the angle γ may be between about 65° and about 85°, e.g., about 70° in exemplary embodiments. Further, as illustrated in FIG. 3, the lattice structure 106 may have different cross-sectional configurations, such as an hourglass configuration as shown on the left and right hand sides of FIG. 3 and/or a honeycomb or hexagonal configuration as shown in the middle of FIG. 3. Other cross-sectional configurations may be used as well.

As further shown in FIG. 3, the inner wall 104 may be discontinuous along the axial direction A such that the inner wall 104 comprises a plurality of inner wall segments 118. An opening 120 is defined between adjacent inner wall segments 118. Further, in the depicted embodiment, the lattice structure 106 adjacent one inner wall segment 118 is different from the lattice structure 106 adjacent the other inner wall segments 118 such that the lattice structure 106 varies along the axial direction A. That is, the lattice structure 106 adjacent a first inner wall segment 118*a* of the plurality of inner wall segments 118 is structurally different from the lattice structure 106 adjacent a second inner wall segment 118*b*, as well as the lattice structure 106 adjacent a third inner wall segment 118*c*. Accordingly, the lattice or auxetic structure 106 may comprise a plurality of sections 122, e.g., a first auxetic section 122*a* adjacent the first inner wall segment 118*a*, a second auxetic section 122*b* adjacent the second inner wall segment 118*b*, and a third auxetic section 122*c* adjacent the third inner wall segment 118*c*.

As previously described, the lattice members 116 of the lattice elements 114 forming the lattice structure 106 may be at different angles with respect to the axial direction A to define a structurally different lattice structure 106 adjacent different inner wall segments 118. For example, the angle of the lattice members 116 in the first auxetic section 122*a* may be different from the angle of the lattice members 116 in the second auxetic section 122*b*. As a more particular example, the lattice members 116 of the third auxetic section 122*c* may be at the angle $\alpha$ with respect to the axial direction A, while the lattice members 116 of the second auxetic section 122*b* may be at the angle $\beta$ with respect to the axial direction A. Additionally or alternatively, the lattice structure 106 may have a different cross-sectional configuration, such as an hourglass configuration and a hexagonal configuration as shown in FIG. 3, adjacent at least two of the inner wall segments 118.

Turning to FIG. 4, in other embodiments, the outer wall 102, rather than the inner wall 104 or in addition to the inner wall 104, may be discontinuous along the axial direction A such that the outer wall 102 comprises a plurality of outer wall segments 124. An opening 126 is defined between adjacent outer wall segments. In the embodiment depicted in FIG. 4, the lattice structure 106 does not vary along the axial direction A, but it will be appreciated that, like the embodiment of FIG. 3, the lattice structure 106 adjacent one outer wall segment 124 could different from the lattice structure 106 adjacent the other outer wall segments 124 such that the lattice structure 106 varies along the axial direction A. That is, the lattice structure 106 adjacent a first outer wall segment 124*a* of the plurality of outer wall segments 124 may be structurally different from the lattice structure 106 adjacent a second outer wall segment 124*b*, as well as a third outer wall segment 124*c*. Thus, in embodiments in which the outer wall 102 is discontinuous and the lattice structure 106 varies along the axial direction A, the lattice or auxetic structure 106 may comprise a plurality of sections 122, e.g., a first auxetic section 122*a* adjacent the first outer wall segment 124*a*, a second auxetic section 122*b* adjacent the second outer wall segment 124*b*, and a third auxetic section 122*c* adjacent the third outer wall segment 124*c*. As described with respect to FIG. 3, the lattice structure 106 may be structurally different between sections 122, for instance, by the lattice members 116 having a different angle with respect to axial direction A (e.g., the angle $\alpha$ in one section 122, the angle $\beta$ in another section 122, and the angle $\gamma$ in yet another section 122) and/or by varying the cross-sectional geometry or configuration.

When the lattice structure 106 varies along the axial direction A, e.g., as illustrated in FIG. 3, the integral casing 100 has different thermal characteristics along the axial direction A. More particularly, the thickness of the outer and inner walls 102, 104 and the configuration of the lattice structure 106 affect the thermal response of the casing 100. For instance, as previously described, an auxetic lattice structure 106 resists the growth motions associated with thermal growth, and the degree of resistance of a particular auxetic structure can be tuned for a particular application, e.g., based on the angle of its members 116 with respect to the axial direction and/or the cross-sectional configuration of the structure. Further, where the casing 100 encases gas turbine engine components such as the combustion section 26 and the turbine sections 28, 30 of the exemplary engine 10, the combustion gases 66 flow within the casing 100 and, more particularly, the inner wall 104 forms a radially outer boundary of the gas flow path. It will be appreciated that the lattice structure 106 conducts heat from the inner wall 104, which is adjacent the combustion gases 66, along the lattice elements 114 to the outer wall 102. The heat conduction along the lattice structure 106 affects how much the outer wall 102 thermally expands and its resistance to thermal growth of the inner wall 104. Varying the lattice structure 106 thereby affects how much heat is conducted along the lattice elements 114, which, in turn, affects the thermal response of the outer wall 102.

Thus, where the thickness of the outer and inner walls 102, 104 remains constant over the axial length of the integral casing 100, varying the configuration of the lattice structure 106 along the axial direction A allows different portions of the casing 100 to have different thermal responses. For example, in one embodiment, the first auxetic section 122*a* is defined adjacent a first module of the core gas turbine engine 16 and the second auxetic section 122*b* is defined adjacent a second module of the engine 16, such that the second module is axially spaced from the first module. The first module may be, e.g., the compressor sections 22, 24 and the second module may be, e.g., the turbine sections 28, 30. In another embodiment, the first auxetic section 122*a* is defined adjacent a first stage of a turbine section, such as the HP turbine section 28 or the LP turbine section 30, of the core gas turbine engine 16 and the second auxetic section 122*b* is defined adjacent a second stage of the turbine section, such that the second stage is downstream of the first stage.

Of course, the integral casing 100 may comprise one, two, three, or more different lattice or auxetic sections 122. Where the casing 100 is installed in a gas turbine engine, each different section 122 may be positioned adjacent a module of the engine, such as the LP compressor section, the HP compressor section, the combustion section, the HP turbine section, or the LP turbine section. Alternatively, the lattice or auxetic structure 106 may vary among the stages of one or more modules of the gas turbine engine. In this way, the thermal response of the integral casing 100 may be tuned for a particular portion of the engine. More specifically, the casing 100 may be constructed such that a lattice structure 106 adjacent a particular module or stage helps ensure the casing 100 is essentially thermally matched to the particular module or stage. As such, the casing 100 may thermally expand at substantially the same rate as the rotating hardware in the module or stage to maintain clearances between the casing 100 and the rotating components. Further, the lattice structure 106 may be configured, e.g., by selecting an angle of its members 116 or its cross-sectional shape, to respond to mechanical loads and/or pressure loads on the casing 100 to maintain rotor tip clearances. Maintaining the clearances between the static casing 100 and the rotating components helps, e.g., the engine to operate efficiently throughout the period of operation.

Referring now to FIG. 5, one or more flow paths may be defined within the lattice structure 106. For example, in the illustrated embodiment, the lattice structure includes a divider member 128 that extends along the axial direction A. Further, the lattice structure 106 defines an inner flow path 130 and an outer flow path 132, such that the divider member 128 separates the inner flow path 130 from the outer flow path 132. The inner flow path 130 is defined adjacent the inner wall 104, and the outer flow path 132 is defined adjacent the outer wall 102. Each of the inner flow path 130 and the outer flow path 132 extend axially within the casing 100. At least one first aperture 134 is defined on a radially inner portion 136 of each lattice element 114 such that the at least one aperture 134 is defined within the inner flow path 130. Similarly, at least one second aperture 138 is defined on a radially outer portion 140 of each lattice element 114 such that the at least one second aperture 138 is defined within the outer flow path 132. As such, the apertures 134, 138 provide openings for a fluid to flow axially through the lattice structure 106, such that the first apertures 134 help define the inner flow path 130 and the second apertures 138 help define the outer flow path 132.

Accordingly, the inner and outer flow paths 130, 132 may be used to provide fluid flows within the space between the outer wall 102 and the inner wall 104 of the casing 100. For example, one or both of the inner and outer flow paths 130, 132 may be used for a flow of cooling air, which may cool the casing 100 and/or may be introduced into the flow path defined by the casing 100, e.g., through the openings 120 between inner wall segments 118 in embodiments having a discontinuous inner wall 104, to cool components within the flow path defined by the casing 100. As another example, the inner flow path 130 may be utilized in a segment of the casing 100 adjacent, e.g., a compressor section of a gas turbine engine to provide a recirculating tip treatment to the rotor blades of the compressor. A recirculating tip treatment bleeds off a portion of a downstream flow of the working fluid through the gas turbine engine, routes the downstream flow outside of the working fluid flow path back upstream of the rotor blades, and directs the higher pressure fluid at the blade tips. The recirculating tip treatment restores the flow quality at the tips of the rotor blades to reduce the effect of the tip clearance, i.e., the gap, between the rotor blade tips and the inner wall 104 of the casing 100. Thus, as illustrated in FIG. 5, a downstream opening 120 in the inner wall 104 may be used to bleed off downstream working fluid F between compressor rotor blades 80 and stator vanes 82. The inner flow path 130 may be used to route the working fluid F back upstream, and an upstream opening 120 may be used to direct the working fluid F toward the tips 84 of compressor rotor blades 80.

In the exemplary embodiment of FIG. 5, the outer flow path 132 may be used for a flow of cooling fluid, such that the inner flow path 130 is utilized in a recirculating tip treatment and the outer flow path 132 is utilized in cooling the casing 100 and/or the components within the flow path of the working fluid. In other embodiments, the integral casing 100 may define only one flow path between the outer and inner walls 102, 104 or may define more than two flow paths between the outer and inner walls 102, 104. Moreover, the one or more flow paths between the outer and inner walls 102, 104 may provide a fluid flow axially, radially, and/or circumferentially and need not be restricted to providing fluid flow proximate the outer wall 102 or the inner wall 104. For instance, a flow path may be defined between outer and inner walls 102, 104 to allow fluid to move circumferentially, e.g., to provide cooling at a specific circumferential location of the casing 100. One or more apertures, such as or similar to apertures 134, 138, may be defined in the lattice structure 106 for the fluid to flow from one portion of the lattice structure 106 to another portion of the lattice structure 106, which may be located radially, axially, and/or circumferentially adjacent to the portion of the lattice structure 106 from which the fluid flows. It will be appreciated that using an additive manufacturing method to form the lattice structure 106 allows freedom in the design of the lattice structure 106 to define one or more flow paths at any suitable location between the outer and inner walls 102, 104.

Turning now to FIGS. 6A-6D, in some embodiments, the outer wall 102 of the integral casing 100 includes one or more outer wall flanges 142 extending along the radial direction R, i.e., extending radially outward from the outer wall 102. The outer wall flanges 142 can increase the rigidity and stiffness of the outer wall 102, thereby adding significant strength to the integral casing 100 without a significant increase in the weight of the casing 100. In addition, a stiffer outer wall 102 may force thermal growth motions of the casing 100 through the lattice structure 106 and onto the inner wall 104. Thus, the outer wall flanges 142 may influence the thermal response of the integral casing 100.

Further, the flanges 142 may define one or more flange openings 144 therethrough. The flange openings 144 allow for assembling the casing 100 to a mating structure, e.g., flange openings 144 facilitate the mounting of accessories or other components to the integral casing 100 or mounting the casing 100 within a gas turbine engine such as turbofan engine 10. Additionally or alternatively, in embodiments in which the casing 100 is axially segmented, the flange openings 144 may be used to couple adjacent casing segments. For instance, an axially segmented casing 100 may comprise two or more segments that each are integrally formed (i.e., each segment has an outer wall 102, an inner wall 104, and a lattice structure 106 that are integrally formed as a single monolithic component) and then are bolted together to simplify assembly and maintenance of the casing.

As shown in the illustrated embodiments, the outer wall flanges 142 are integrally formed with the outer wall 102 and, thus, with the inner wall 104 and lattice structure 106 such that the flanges 142 are part of the single monolithic casing component. Moreover, although FIGS. 6A-6D provide schematic cross-section views that show only a portion of the outer wall 102, it will be appreciated that the outer wall 102 preferably is annular in shape, such that the outer wall flanges 142 also are annular and extend circumferentially about the axial centerline 12. Further, as depicted in the figures, the outer wall flanges 142 may have a variety of configurations. Referring to FIG. 6A, the outer wall 102 includes an outer wall flange 142 at a forward end of the casing 100 and an outer wall flange 142 at an aft end of the casing 100. Each of the flanges 142 defines a flange opening 144 therethrough. A fastener 146 extends through the flange opening 144 on a forward end of the casing 100 to attach or couple the casing 100 to a mating structure 148, which may be an accessory, another component of engine 10, or the like. Each flange opening 144 may be configured to receive a fastener 146 to assemble the casing 100 with one or more mating structures 148.

As illustrated in FIGS. 6B and 6C, in other embodiments, the outer wall 102 includes one or more intermediate outer wall flanges 142 between the forward and aft flanges 142; the intermediate flanges 142 may or may not define flange openings therein. The intermediate flanges 142 may have the same height h, or radial length, as the forward and aft flanges 142, such as the flanges 142 shown in FIG. 6C. Alternatively, the intermediate flanges 142 may have a different height from the forward and aft flanges 142, such as the intermediate flanges 142 of the embodiment of FIG. 6B, which are shorter than the forward and aft flanges 142. Referring to FIG. 6D, in still other embodiments, the outer wall 102 includes only intermediate outer wall flanges 142, i.e., the outer wall 102 does not include a forward outer wall flange 142 or an aft outer wall flange 142, and the intermediate flanges 142 do not define flange openings 144 therein. However, in other embodiments, the intermediate flanges 142 may define one or more flange openings 144, e.g., for assembling one or more accessories, etc. with the casing 100. It will be appreciated that the flange openings 144 illustrated in FIGS. 6B and 6C, and that could be defined in the intermediate flanges 142 of FIG. 6D, also may receive fasteners 146 such that the exemplary casings 100 may be assembled with one or more mating structures 148, e.g., as illustrated in FIG. 6A. Additionally, as illustrated in FIGS. 6A-6D, the thickness t, or axial length, of the outer wall flanges 142 may vary. For example, the outer wall flanges 142 in FIG. 6A are thicker than the outer wall flanges 142 in FIG. 6B. In some embodiments, the thickness t of one or more outer wall flanges 142 of the integral casing 100 may be different than the thickness t of at least one other flange 142 of the casing 100, e.g., the forward and aft flanges 142 may be thicker than the intermediate flanges 142 or vice versa.

It should be appreciated that the integral casing 100 is described herein only for the purpose of explaining aspects of the present subject matter. For example, the integral casing 100 will be used herein to describe exemplary configurations, constructions, and methods of manufacturing the integral casing 100. It should be appreciated that the additive manufacturing techniques discussed herein may be used to manufacture other casings or similar components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of the integral casing 100 according to an exemplary embodiment of the present subject matter has been presented, an exemplary method 700 for forming an integral casing according to an exemplary embodiment of the present subject matter is provided. Method 700 can be used by a manufacturer to form the integral casing 100, or any other suitable casing or housing. It should be appreciated that the exemplary method 700 is discussed herein only to describe exemplary aspects of the present subject matter and is not intended to be limiting.

Referring now to FIG. 7, method 700 includes, at step 710, depositing a layer of additive material on a bed of an additive manufacturing machine. Method 700 further includes, at step 720, selectively directing energy from an energy source onto the layer of additive material to fuse a portion of the additive material and form a casing. For example, using the example from above, the integral casing 100 may be formed for encasing the compressor sections 22, 24, the combustion section 26, and the turbine sections 28, 30 of the core turbine engine 16 of the turbofan jet engine 10.

The additively manufactured casing may include an annular outer wall 102, an annular inner wall 104 that is defined radially inward of the outer wall 102 such that the outer wall 102 circumferentially surrounds and is radially spaced apart from the inner wall 104, and a lattice structure 106 extending from the inner wall 104 to the outer wall 102. In exemplary embodiments of the additively manufactured casing 100, the lattice structure 106 is an auxetic lattice structure 106 that includes a plurality of lattice elements 114. Each lattice element 114 extends circumferentially from the inner wall 104 to the outer wall 102, and the plurality of lattice elements 114 are spaced apart from one another along the axial direction A. Notably, according to an exemplary embodiment, the outer wall 102, the inner wall 104, and the lattice structure 106 are integrally formed as a single monolithic component.

FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 700 are explained using the integral casing 100 as an example, it should be appreciated that these methods may be applied to manufacture any suitable casing, housing, or similar component.

FIGS. 8A through 10B illustrate additional exemplary embodiments of the present subject matter. Referring to FIGS. 8A and 8B, schematic cross-section views are provided of a portion of the integral casing 100 according to another exemplary embodiment of the present subject matter. As previously described, the casing 100 has an outer wall 102, an inner wall 104, and a lattice structure 106 extending from the inner wall 104 to the outer wall 102. In the depicted embodiment, the lattice structure 106 is circumferentially discontinuous, defining a plurality of fluid channels 150 between sections of the lattice structure 106. That is, the fluid channels 150 are integrally formed with the outer wall 102, inner wall 104, and lattice structure 106 such that the fluid channels 150 are part of the single monolithic casing component. A fluid, such as air, may pass through the fluid channels 150 to heat or cool engine components within or near the casing 100, or to be routed to one or more locations for heating or cooling. The fluid channels 150 may be spaced uniformly along the circumferential direction C, as shown in FIG. 8A, or the fluid channels 150 may be spaced to provide more or less fluid for heating or cooling in a given circumferential location. As an example, the use of fluid channels 150 at certain locations within the casing 100 could help overcome the uneven heating of a gas turbine engine (e.g., turbofan engine 10) in a soakback condition, after the engine is shut down. As further shown in FIG. 8A, the fluid channels 150 may be defined such that the fluid flowing therethrough contacts the inner wall 104 and the outer wall 102, i.e., the fluid channels 150 may be defined to extend the full radial distance between the inner wall 104 and the outer wall 102.

FIGS. 9A and 9B provide schematic cross-section views of a portion of the integral casing 100 according to yet another exemplary embodiment of the present subject matter. As described herein, the casing 100 has an outer wall 102, an inner wall 104, and a lattice structure 106 that extends from the inner wall 104 to the outer wall 102. In the embodiment shown in FIGS. 9A and 9B, a plurality of tubes 152 extends through the lattice structure 106. The tubes 152 may be inserted during the manufacture of the casing 100 or may be integrally formed with the lattice structure 106, i.e., the lattice structure 106 may define the tubes 152. Similar to the fluid channels 150 illustrated in FIGS. 8A and 8B, a fluid, such as air, may pass through the tubes 152 to heat or cool engine components within or near the casing 100, or to be routed to one or more locations for heating or cooling. The tubes 152 may be spaced uniformly along the circumferential direction C, as shown in FIG. 9A, or the tubes 152 may be spaced to provide more or less fluid for heating or cooling in a given circumferential location. Moreover, as depicted, the tubes 152 may extend within the lattice structure 106 such that the tubes 152 are spaced from the inner wall 104 and the outer wall 102, but in other embodiments, the tubes 152 may be in contact with either the inner wall 104 or the outer wall 102, e.g., to provide heating or cooling at a given location.

FIGS. 10A and 10B provide schematic cross-section views of a portion of the integral casing 100 according to a further exemplary embodiment of the present subject matter. Like the other embodiments described herein, the illustrated casing 100 has an outer wall 102, an inner wall 104, and a lattice structure 106 that extends from the inner wall 104 to the outer wall 102. In the embodiment of FIGS. 10A and 10B, the lattice structure 106 is constructed in a pattern with an open area 154 between sections of the lattice structure 106. More particularly, the lattice structure 106 is discontinuous along the radial direction R, the axial direction A, and the circumferential direction C to allow fluid to pass between section of the lattice structure 106 for even distribution of the fluid for heating or cooling. For example, as shown in FIG. 10B, the lattice structure 106 may be constructed in a honeycomb pattern, with an open area 154 defined between each hexagonal section of lattice material. The lattice structure 106 may be constructed in other patterns as well that define an open area 154 for the passage of fluid therethrough. Additionally, it will be appreciated that the lattice structure 106 of the embodiments of FIGS. 8A through 10B may be an auxetic lattice structure 106 formed from an auxetic material as described herein. Further, the lattice structure 106 may be configured as described herein with respect to other embodiments of the casing 100, e.g., the lattice structure 106 of the embodiments of FIGS. 8A through 10B may have an hourglass or honeycomb cross-section as illustrated in FIG. 3.

An integral casing and a method for manufacturing an integral casing are described above. Notably, the integral casing 100 generally may include geometries and configurations whose practical implementations are facilitated by an additive manufacturing process, as described herein. For example, using the additive manufacturing methods described herein, the integral casing 100 may include a plurality of auxetic sections 122 such that the casing 100 is tuned to respond to the particular loads at certain sections of the casing 100. As another example, the integral casing 100 may include a lattice structure 106 having any suitable configuration for maintaining the rotor tip clearances between the tips of the engine rotor blades and the inner surface 108 of the inner wall 104 of the casing 100. The foregoing features, as well as the other features described herein, may be introduced during the design of the casing, such that they may be easily integrated into the turbine center frame during the build process at little or no additional cost. Moreover, the entire casing, including the inner wall, the outer wall, the lattice structure, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A casing defining a radial direction, an axial direction, and a circumferential direction, the casing comprising:
   an annular inner wall extending along the axial direction;
   an annular outer wall extending along the axial direction, the outer wall spaced apart from the inner wall along the radial direction; and
   an auxetic structure extending from the inner wall to the outer wall, the auxetic structure including a plurality of lattice elements, each lattice element extending along the circumferential direction and from the inner wall to the outer wall along the radial direction, the plurality of lattice elements spaced apart from one another along the axial direction,
   wherein at least one aperture is defined in the auxetic structure for a flow of fluid from one portion of the auxetic structure to another portion of the auxetic structure,
   wherein the inner wall, outer wall, and auxetic structure are integrally formed as a single monolithic component,
   wherein the inner wall is discontinuous along the axial direction such that the inner wall comprises a plurality of inner wall segments, and
   wherein an opening is defined between adjacent inner wall segments.

2. The casing of claim 1, wherein the auxetic structure adjacent a first inner wall segment of the plurality of inner wall segments is structurally different from the auxetic structure adjacent a second inner wall segment of the plurality of inner wall segments.

3. The casing of claim 2, wherein the auxetic structure comprises a plurality of lattice members, each lattice member extending at an angle with respect to the axial direction, and wherein the angle of the lattice members adjacent the first inner wall segment is different from the angle of the lattice members adjacent the second inner wall segment.

4. The casing of claim 1, wherein the outer wall is discontinuous along the axial direction such that the outer wall comprises a plurality of outer wall segments, and wherein an opening is defined between adjacent outer wall segments.

5. The casing of claim 4, wherein the auxetic structure adjacent a first outer wall segment of the plurality of outer wall segments is structurally different from the auxetic structure adjacent a second outer wall segment of the plurality of outer wall segments.

6. The casing of claim 5, wherein the auxetic structure comprises a plurality of lattice members, each lattice member extending at an angle with respect to the axial direction, and wherein the angle of the lattice members adjacent the first outer wall segment is different from the angle of the lattice members adjacent the second outer wall segment.

7. The casing of claim 1, wherein the auxetic structure defines an inner flow path defined adjacent the inner wall and an outer flow path defined adjacent the outer wall, and wherein the inner flow path is separated from the outer flow path by a divider member extending along the axial direction.

8. An additively manufactured casing defining a radial direction, an axial direction, and a circumferential direction, the additively manufactured casing comprising:
    an annular inner wall extending along the axial direction;
    an annular outer wall extending along the axial direction, the outer wall spaced apart from the inner wall along the radial direction; and
    an auxetic structure extending from the inner wall to the outer wall, the auxetic structure including a plurality of lattice elements, each lattice element extending along the circumferential direction and from the inner wall to the outer wall along the radial direction, the plurality of lattice elements spaced apart from one another along the axial direction,
    wherein the auxetic structure is configured to vary the thermal characteristics of the casing along the axial direction,
    wherein the outer wall is discontinuous along the axial direction such that the outer wall comprises a plurality of outer wall segments, wherein an opening is defined between adjacent outer wall segments,
    wherein the auxetic structure varies between at least two adjacent outer wall segments, and
    wherein the auxetic structure comprises a first auxetic section and a second auxetic section, the first auxetic section differing structurally from the second auxetic section.

9. The additively manufactured casing of claim 8, wherein the inner wall is discontinuous along the axial direction such that the inner wall comprises a plurality of inner wall segments, wherein an opening is defined between adjacent inner wall segments, and wherein the auxetic structure varies between at least two adjacent inner wall segments.

10. The additively manufactured casing of claim 8, wherein the casing is a housing of a gas turbine engine, and wherein the first auxetic section is defined adjacent a first module of the gas turbine engine and the second auxetic section is defined adjacent a second module of the gas turbine engine, the second module axially spaced from the first module.

11. The additively manufactured casing of claim 8, wherein the casing is a housing of a gas turbine engine, and wherein the first auxetic section is defined adjacent a first stage of a turbine section of the gas turbine engine and the second auxetic section is defined adjacent a second stage of the turbine section, the second stage downstream of the first stage.

12. The additively manufactured casing of claim 8, wherein each lattice element comprises a plurality of lattice members, each lattice member extending at an angle with respect to the axial direction, and wherein the angle of the lattice members in the first auxetic section is different from the angle of the lattice members in the second auxetic section.

13. The additively manufactured casing of claim 8, wherein the outer wall includes an outer wall flange that extends outward along the radial direction from the outer wall and is integral with the outer wall.

14. The additively manufactured casing of claim 13, wherein a flange opening is defined in the outer wall flange.

15. The additively manufactured casing of claim 14, wherein the flange opening receives a fastener to assemble the additively manufactured casing with a mating structure.

16. A method of manufacturing a casing, the method comprising:
    depositing a layer of additive material on a bed of an additive manufacturing machine; and
    selectively directing energy from an energy source onto the layer of additive material to fuse a portion of the additive material and form the casing, the casing defining a radial direction, an axial direction, and a circumferential direction, the casing comprising:
        an annular inner wall extending along the axial direction;
        an annular outer wall extending along the axial direction, the outer wall spaced apart from the inner wall along the radial direction; and
        an auxetic structure extending from the inner wall to the outer wall, the auxetic structure including a plurality of lattice elements, each lattice element extending along the circumferential direction and from the inner wall to the outer wall along the radial direction, the plurality of lattice elements spaced apart from one another along the axial direction,
        wherein at least one aperture is defined in at least one lattice element,
        wherein the outer wall is discontinuous along the axial direction such that the outer wall comprises a plurality of outer wall segments, and
        wherein an opening is defined between adjacent outer wall segments.

17. The method of claim 16, wherein the inner wall, outer wall, and auxetic structure are integrally formed as a single monolithic component.

18. The method of claim 16, wherein the auxetic structure adjacent a first outer wall segment of the plurality of outer wall segments is structurally different from the auxetic structure adjacent a second outer wall segment of the plurality of outer wall segments.

19. The method of claim 18, wherein the auxetic structure comprises a plurality of lattice members, each lattice member extending at an angle with respect to the axial direction, and wherein the angle of the lattice members adjacent the first outer wall segment is different from the angle of the lattice members adjacent the second outer wall segment.

* * * * *